US009124869B2

(12) United States Patent
Zhang et al.

(10) Patent No.: US 9,124,869 B2
(45) Date of Patent: Sep. 1, 2015

(54) SYSTEMS AND METHODS FOR VIDEO DENOISING

(71) Applicant: Futurewei Technologies, Inc., Plano, TX (US)

(72) Inventors: Dong-Qing Zhang, Plainsboro, NJ (US); Bo Wang, College Station, TX (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 409 days.

(21) Appl. No.: 13/739,976

(22) Filed: Jan. 11, 2013

(65) Prior Publication Data

US 2013/0177085 A1    Jul. 11, 2013

Related U.S. Application Data

(60) Provisional application No. 61/585,531, filed on Jan. 11, 2012.

(51) Int. Cl.
*H04N 11/02* (2006.01)
*H04N 19/55* (2014.01)
*H04N 19/80* (2014.01)

(52) U.S. Cl.
CPC ......... *H04N 19/00642* (2013.01); *H04N 19/80* (2014.11)

(58) Field of Classification Search
CPC .............................................. H04N 19/00642
USPC ...................... 375/240.01–240.29
See application file for complete search history.

(56) References Cited

U.S. PATENT DOCUMENTS

| | | |
|---|---|---|
| 2005/0036558 A1 | 2/2005 | Dumitras et al. |
| 2007/0030900 A1 | 2/2007 | Verdu et al. |
| 2007/0140587 A1 | 6/2007 | Wong et al. |
| 2010/0245670 A1 | 9/2010 | Takeda et al. |
| 2011/0317916 A1 | 12/2011 | Zhang et al. |

OTHER PUBLICATIONS

Zhang, Z., Parameter Estimation Techniques: A Tutorial with Application to Conic Fitting; Image and Vision Computing, vol. 15, No. 1, pp. 59-76, Jan. 1997; INRIA, 2004 route des Lucioles, BP 93, F-06902 Sophia-Antipolis Cedex, France; total 34 pages.
Elad, M., On the Origin of the Bilateral Filter and Ways to Improve It; IEEE Transactions on Image Processing, vol. 11, No. 10, Oct. 2002; total 11 pages.

*Primary Examiner* — Dave Czekaj
*Assistant Examiner* — Leron Beck
(74) *Attorney, Agent, or Firm* — Futurewei Technologies, Inc.

(57) ABSTRACT

A method for video denoising, the method includes extracting a current pixel from a current video frame and n−1 pixels from respective n−1 previous video frames to form an n-point pixel data set, wherein the current pixel has an initial value; temporally filtering the current pixel using the n-point pixel data set to generate a temporal estimated true value for the pixel; estimating a quantity of outliers in the n-point pixel data set; if the quantity of outliers is greater than or equal to a threshold, spatially filtering the current pixel using neighboring pixels in the current video frame to generate an spatial estimated true value for the pixel, and using the spatial estimated true value for the pixel as a final estimated value for the pixel; if the quantity of outliers is less than the threshold, using the temporal estimated true value for the pixel as the final estimated value for the pixel.

2 Claims, 4 Drawing Sheets

SYSTEMS AND METHODS FOR VIDEO DENOISING

This application claims the benefit of U.S. Provisional Application No. 61/585,531 filed on Jan. 11, 2012, entitled "System and Methods for Video Denoising," which application is hereby incorporated herein by reference.

TECHNICAL FIELD

The present invention relates to systems and methods for video processing, and, in particular embodiments, to systems and methods for video denoising.

BACKGROUND

Video noise reduction is a significant component in modern video encoding architecture, and video denoising can substantially improve video quality and video compression efficiency for video encoding. Denoising algorithms are traditionally one of the primary components in the preprocessing modules in commercial video encoders. Many of the encoders have advanced denoising functions, such as motion compensated 3D denoising. A spatial-temporal hybrid filter with motion compensation is an advanced denoising technology used by many commercial video encoders. Prior art filtering methods, however, can be prone to unreliable local pixel data used for filtering operations, which can result in unreliable filtering results and visual artifacts. In video, the unreliable data, also known as outliers, are often caused by object motion and occlusion.

SUMMARY

An embodiment method for video denoising includes (a) extracting a current pixel from a current video frame and n−1 pixels from respective n−1 previous video frames to form an n-point pixel data set, wherein the current pixel has an initial value, (b) temporally filtering the current pixel using the n-point pixel data set to generate a temporal estimated true value for the pixel, (c) estimating a quantity of outliers in the n-point pixel data set, (d) if the quantity of outliers is greater than or equal to a threshold, spatially filtering the current pixel using neighboring pixels in the current video frame to generate an spatial estimated true value for the pixel, and using the spatial estimated true value for the pixel as a final estimated value for the pixel, (e) if the quantity of outliers is less than the threshold, using the temporal estimated true value for the pixel as the final estimated value for the pixel, and (f) repeating (a), (b), (c), (d) and (e) for all pixels in the current video frame.

An embodiment system for video denoising includes a memory configured to store a video comprising a current video frame and n−1 previous video frames, and a processor couple to the memory. The processor is configured to (a) extract a current pixel from the current video frame and n−1 pixels from the respective n−1 previous video frames to form an n-point pixel data set, wherein the current pixel has an initial value, (b) temporally filter the current pixel using the n-point pixel data set to generate a temporal estimated true value for the pixel, (c) estimate a quantity of outliers in the n-point pixel data set, (d) if the quantity of outliers is greater than or equal to a threshold, spatially filter the current pixel using neighboring pixels in the current video frame to generate an spatial estimated true value for the pixel, and use the spatial estimated true value for the pixel as a final estimated value for the pixel, (e) if the quantity of outliers is less than the threshold, use the temporal estimated true value for the pixel as the final estimated value for the pixel, and (f) repeat (a), (b), (c), (d) and (e) for all pixels in the current video frame.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
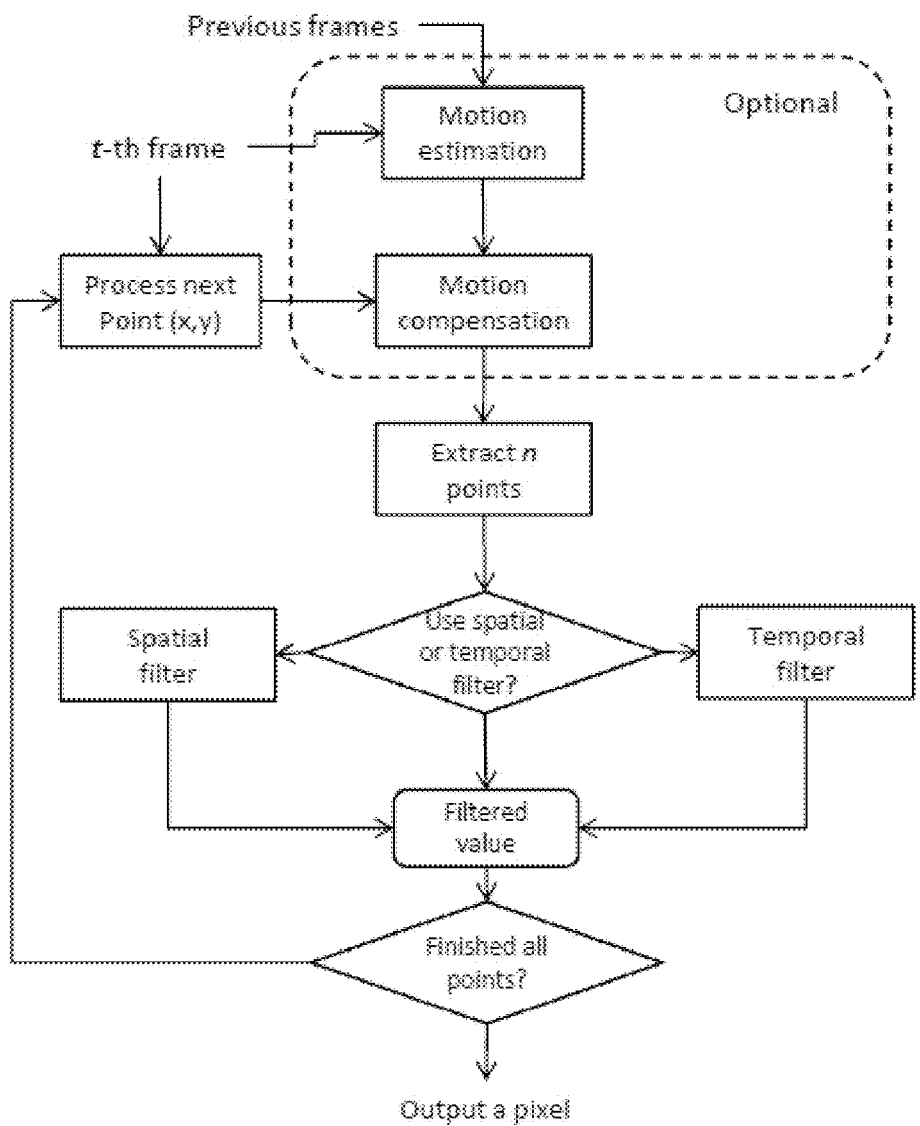
FIG. 1 is a flow diagram illustrating a prior art spatial-temporal hybrid filter.

FIG. 1 illustrates a prior art spatial-temporal hybrid filter. For each input video frame, the algorithm firsts run a motion estimation process to estimate the pixel displacement of the pixels in the input frame with respect to the previous frames. Then, for each pixel point (x, y) in the input video frame, a motion compensation process is run to align all the corresponding pixels in the previous frames with the current pixel points using motion vectors.

The motion estimation and compensation is optional in the filtering framework. Filtering with motion compensation will result in more accurate results but more computational costs. The aligned pixels together with the current pixel point are then extracted to form a pixel set with n pixel points. A spatial-temporal filter determination process then is performed to determine whether to use a spatial filter or a temporal filter. This is usually realized using certain rules that infer which filter is better. After the spatial or temporal filter is determined to be better, only one of the spatial filter or the temporal filter is selected to generate the filtering results. The filtering process then calls the basic spatial or temporal filter function. The filtering process generates a pixel value for the given pixel point. The algorithm then goes to the next pixel point to perform similar processing until all pixel points are processed.

Generally, there are two limitations to this method. First, signal statistics are not estimated for the filter determination, which therefore may result in an incorrect filter choice, and incorrect filter results. Second, both spatial and temporal filters generally do not consider the reliability of the pixel data used for filtering, and therefore may result in inaccurate filter results.

An embodiment robust spatial-temporal hybrid filter takes into account the pixel data reliability and has the capability of estimating pixel data statistics for more robust spatial/temporal filter switching and more reliable filtering results.

An embodiment method for video or image denoising considers the reliability of the data used for the filtering process. Such a denoising filter scheme is more robust with respect to data outliers that are present in many real-world scenarios, such as videos with object motion. Prior art filtering methods do not consider the data reliability factor, and therefore can be prone to errors from the pixel data outliers.

An embodiment reduces noise caused by video acquisition devices, and increases video quality and video coding efficiency. Embodiments may be applied to video encoder and media networking products, such as component video encoders and video encoding servers.

Figure 2:
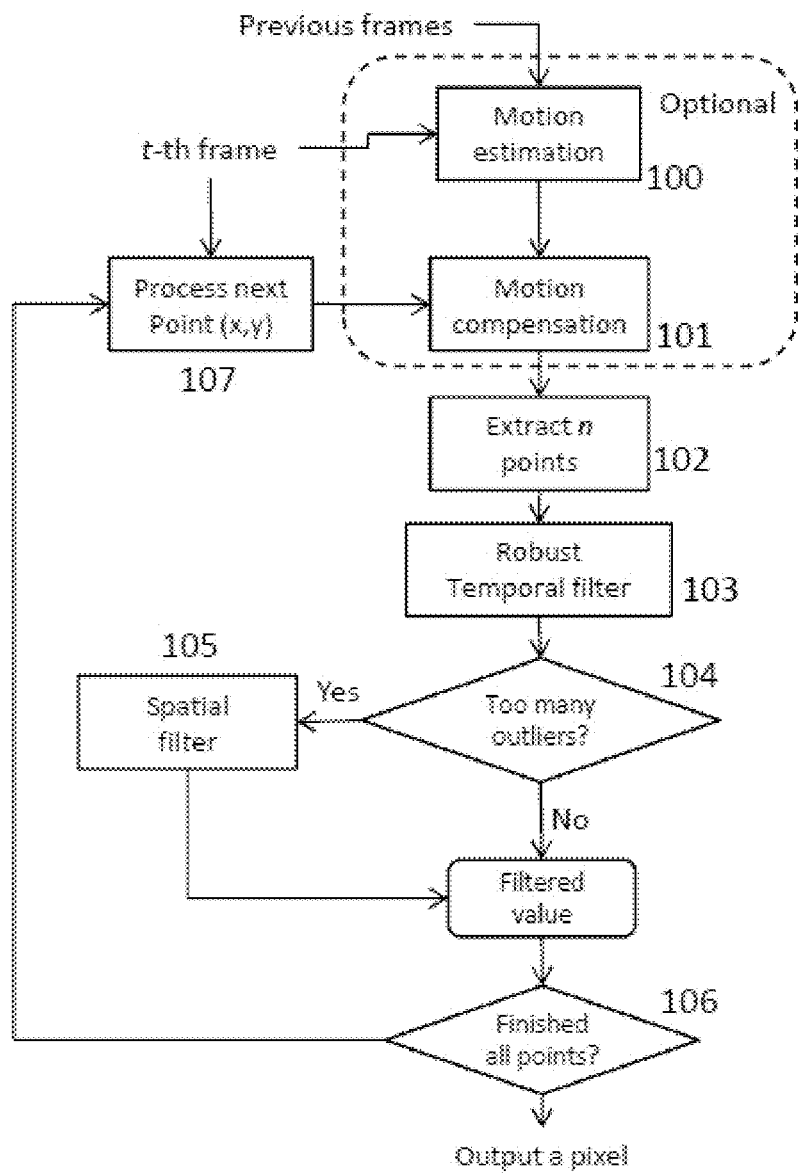
FIG. 2 is a flow diagram illustrating a robust spatial-temporal hybrid filter.

FIG. 2 illustrates an embodiment robust spatial-temporal hybrid filter. For each incoming video frame, block 100 performs a motion estimation operation to estimate the motion vector for every pixel point. Then block 107 processes each pixel point one after another in a loop. Block 101 performs motion compensation, i.e., aligning all the corresponding pixels with respect to the current pixel point in the previous n−1 frames using motion vectors. A motion vector connects the current pixel with a pixel in the previous frame, and the pixel pair are called corresponding pixels. Block 100 and block 101 are optional. The presence of block 100 and 101 generally will result in more accurate filter results but more computational cost. After motion compensation is performed, in block 102 all previous n−1 aligned pixels together with the current pixel point are extracted and form an n-point data set. Block 103 then performs a robust temporal filtering process to estimate the filtering result. The robust temporal filter may be the denoising filter described in reference [1], which takes into account the pixel data reliability and down weights or excludes unreliable pixel data from contributing to filtering operations.

Figure 3:
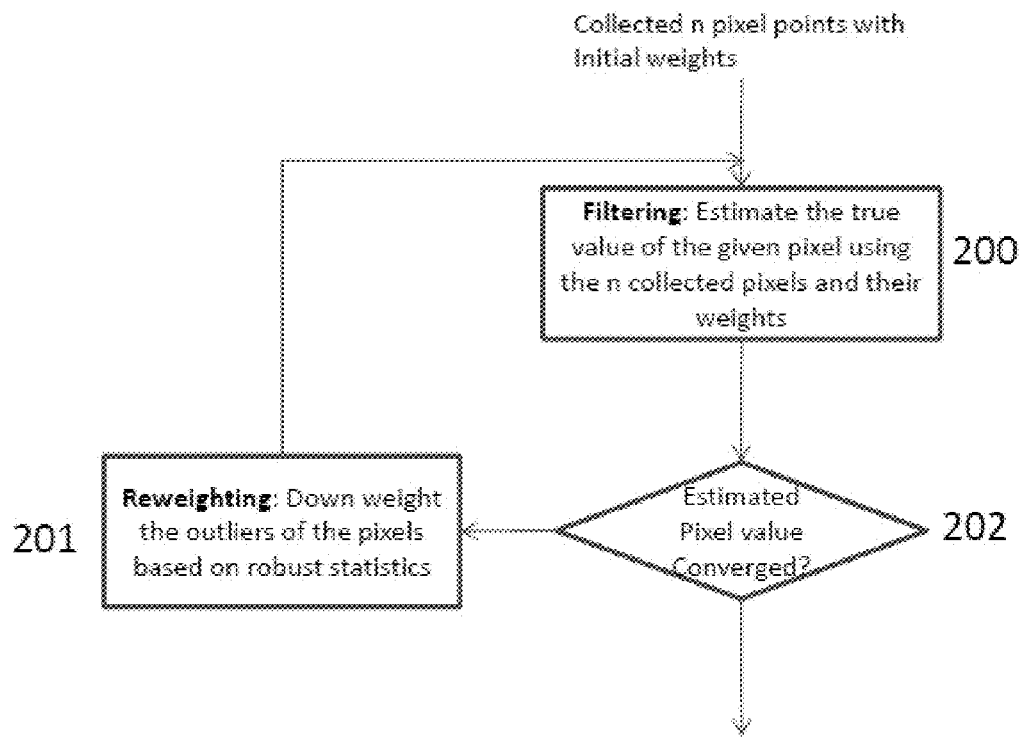
FIG. 3 illustrates a robust temporal filter.
Figure 4:
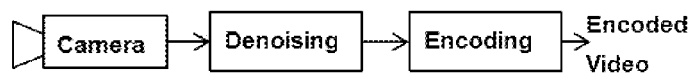
FIG. 4 is a block diagram illustrating an embodiment application.

FIG. 3 illustrates a flow chart of an embodiment robust temporal filter, and FIG. 4 illustrates an embodiment system for generating an encoded video from a video input. In FIG. 3, block 200 is a filtering process that estimates the true pixel value using the n pixel points with their weights. Block 202 compares the newly estimated pixel value with the old value, and if the difference is less than a threshold, the algorithm will exit the filtering-reweighting iteration. If not, the algorithm enters block 201, which uses robust statistics to estimate whether or not a neighboring pixel is reliable. If the pixel is not reliable, the weight of the pixel is decreased. Then the process goes back to block 200.

Block 200 and block 201 can be implemented with different filtering methods and different reweighting methods. In one embodiment, the filtering can be implemented simply as an average of all the neighboring pixels, which is a simple smoothing filter. The re-weighting process can be implemented using a robust estimation method called M-estimator. In such a setting, for the filtering step, the following equation can be used to estimate the true value of the pixel according to neighboring pixels:

$$q = \frac{\Sigma_i w_i p_i}{\Sigma_i w_i} \quad (1)$$

Where q is the estimated true pixel value, $p_i$ are the pixels in the n pixel point set, and $w_i$ is the weight assigned to each $p_i$. The weights are initialized as 1 at the start of the algorithm. For the re-weighting step, the following equation is used for a Cauchy type of M-estimator:

$$w_i = \frac{1}{1 + ((p_i - q)/c)^2} \quad (2)$$

where c is an adjustable constant value, and other variables have been defined in Eq. (1). Apart from the above described robust averaging filter, other similar filters can be also designed according to the same principle with different equations Eq. (1) and Eq. (2)

Referring back to FIG. 2, block 103, which is the robust temporal filter, not only estimates the filtering result, but also estimates how many pixels in the n pixel points are outliers. This information is used in block 104 to perform filter switching. If too many outliers are present, it means the true pixel value cannot be reliably estimated using robust temporal filter, and therefore the algorithm switches to a spatial filter to perform a spatial filtering process. The spatial filtering process is similar to a regular smoothing filter or low-pass filter that collects spatial neighborhood data and uses them to get the result. In this embodiment, a bilateral filter is used for spatial filtering. In this embodiment, block 104 is implemented as a thresholding process. If the estimated value q passes the following thresholding test, then q is taken as the final value; otherwise the algorithm switches to a spatial filtering process.

$$\frac{\# \text{ of } |p_i - q| < \alpha}{n} > \beta$$

AND $$|p_{original} - q| < \alpha$$

where α and β are two thresholds, q is the estimated true pixel value, $p_i$ are the pixels in the n pixel point set, and $p_{original}$ is the original pixel value of the current pixel point.

Various embodiments improve upon conventional methods with additional features. First, an embodiment method uses a robust temporal filter (temporal M-estimator filter) to take into account the reliability of the pixel data used for filtering operation. Unreliable pixel data are down weighted or excluded from the filtering operation. Second, the spatial temporal filter switching mechanism uses the pixel data statistics from the robust temporal filter results. If there are too many pixel data outliers for a robust temporal filter, the filtering process switches to a spatial filter. These additional features provide increased reliability, especially when pixel data outliers are present, for example, in video frames with object motion.

Figure 5:
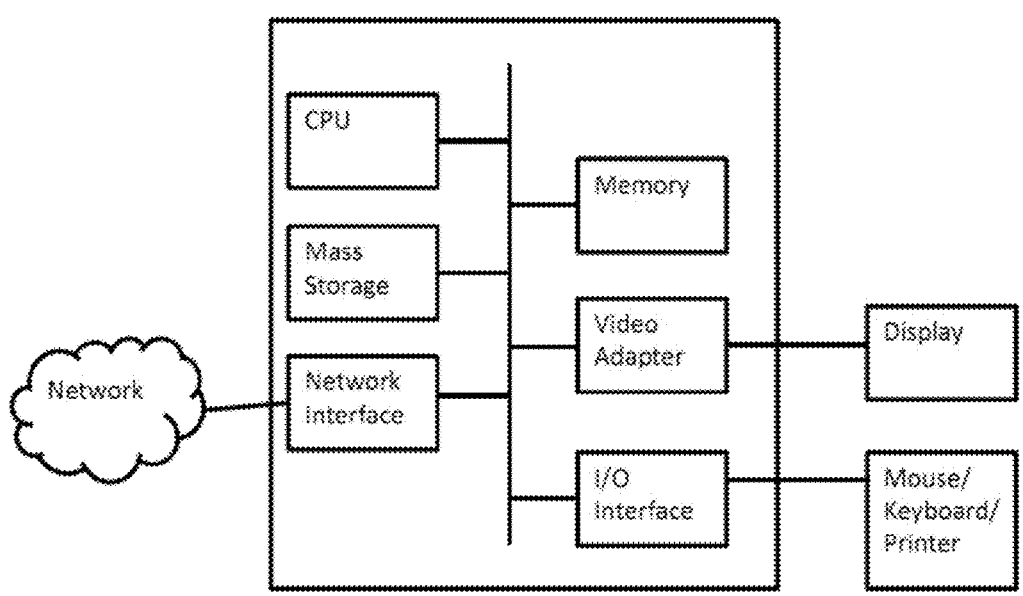
FIG. 5 is a block diagram illustrating a computing platform that may be used for implementing, for example, the devices and methods described herein, in accordance with an embodiment.

FIG. 5 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

The following references are related to subject matter of the present application. Each of these references is incorporated herein by reference in its entirety:

[1] Dong-Qing Zhang, U.S. Provisional Patent Application Ser. No. 61/585,100, filed Jan. 10, 2012, entitled "Systems and Methods for Video Denoising."
[2] Zhengyou Zhang, Parameter Estimation Techniques: A Tutorial with Application to Conic Fitting, Image and Vision Computing, vol. 15 (No. 1), January 1997.
[3] Michael Elad, On the Origin of the Bilateral Filter and Ways to Improve It, IEEE Transactions on Image Processing, vol. 11 (No. 10), October 2002.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for video denoising, the method comprising:
extracting a current pixel from a current video frame and n−1 pixels from respective n−1 previous video frames to form an n-point pixel data set, wherein the current pixel has an initial value;
temporally filtering the current pixel using the n-point pixel data set to generate a temporal estimated true value for the pixel;
estimating a quantity of outliers in the n-point pixel data set;
if the quantity of outliers is greater than or equal to a threshold, spatially filtering the current pixel using neighboring pixels in the current video frame to generate an spatial estimated true value for the pixel, and using the spatial estimated true value for the pixel as a final estimated value for the pixel;
if the quantity of outliers is less than the threshold, using the temporal estimated true value for the pixel as the final estimated value for the pixel.

2. A system for video denoising, the system comprising:
a memory configured to store a video comprising a current video frame and n−1 previous video frames; and
a processor couple to the memory and configured to
extract a current pixel from the current video frame and n−1 pixels from the respective n−1 previous video frames to form an n-point pixel data set, wherein the current pixel has an initial value;
temporally filter the current pixel using the n-point pixel data set to generate a temporal estimated true value for the pixel;
estimate a quantity of outliers in the n-point pixel data set;
if the quantity of outliers is greater than or equal to a threshold, spatially filter the current pixel using neighboring pixels in the current video frame to generate an spatial estimated true value for the pixel, and use the spatial estimated true value for the pixel as a final estimated value for the pixel;
if the quantity of outliers is less than the threshold, use the temporal estimated true value for the pixel as the final estimated value for the pixel.

* * * * *